Feb. 1, 1938. S. K. HUSTON, JR Re. 20,645

GLAZING CONSTRUCTION

Original Filed Sept. 10, 1934

Witness:
V. Silgander

Inventor
Sanford K. Huston, Jr.
By: Ernest E. Tupes
Atty.

Reissued Feb. 1, 1938

Re. 20,645

UNITED STATES PATENT OFFICE 20,645

GLAZING CONSTRUCTION

Sanford K. Huston, Jr., Chicago, Ill.

Original No. 2,002,536, dated May 28, 1935, Serial No. 743,397, September 10, 1934. Application for reissue January 22, 1937, Serial No. 122,915

7 Claims. (Cl. 108—16)

My invention relates to glazing construction and more particularly it relates to glazing construction providing a support and water-proof joint for adjacent panes of glass forming the roof or side walls of buildings.

The invention provides improvements in the structure shown and described in my pending application, Serial No. 680,423, filed July 14th, 1933.

Among the objects of the invention is the provision of a durable, simple, efficient and inexpensive glazing construction in which the supporting members are protected from corrosion and the glazing members are substantially free from strains and the breakage occasioned by internal strains is reduced to a minimum.

Another object of the invention is the provision of an improved glazing construction comprising relatively few members adapted for mounting upon a rafter or supporting member in spaced relation thereto to permit circulation of air between the supporting members and the glazing members and thereby minimize condensation and corrosion and eliminate the necessity for providing electrical insulating members between the supporting members and the glazing construction.

A further object of the invention is to provide improvements in glazing construction and supporting members therefor disclosed in sundry details hereinafter described and more particularly pointed out in the claims.

Many other objects of the construction herein shown and described will be obvious to those skilled in the art from the disclosure herein given.

To this end my invention consists in the novel construction, arrangement and combination of parts herein shown and described and more particularly pointed out in the claims.

In the drawing, wherein like reference characters indicate like or corresponding parts:

Figure 1:
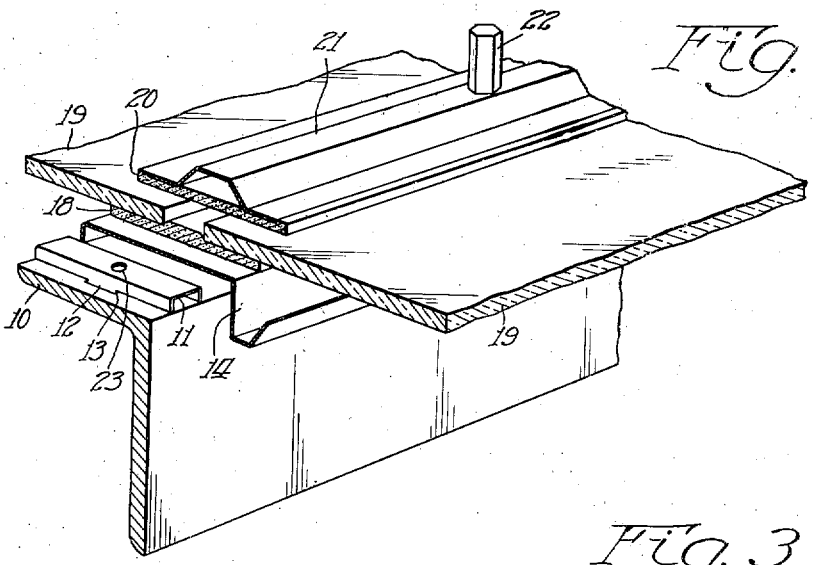
Fig. 1 is a broken perspective view of a unit of a skylight construction embodying the invention.
Figure 2:
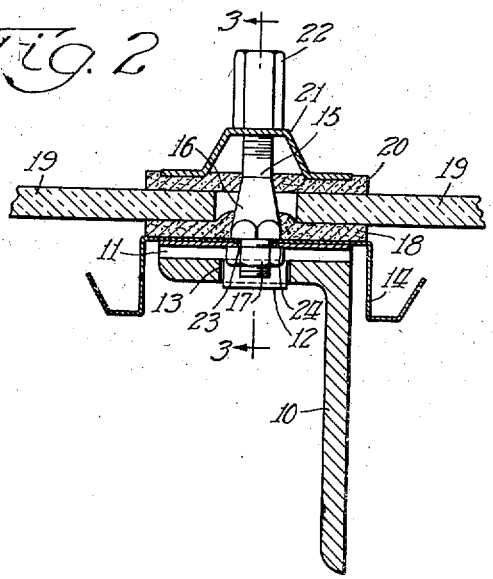
Fig. 2 is a cross section taken at any point coincident with one of a plurality of channel spacers positioned between the supporting member and the glazing construction.
Figure 3:
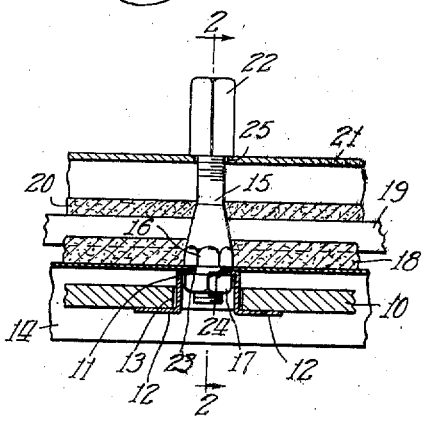
Fig. 3 is a section along the line 3—3 of Fig. 2.

Referring now more particularly to the drawing, I have illustrated only a part of a skylight unit, it being understood that an assembly construction in most cases consists of a large number of such units, each of which rests upon and is secured to a rafter or other supporting member 10 by a plurality of spacer members 11 fastened in longitudinal, spaced-apart relation to the rafter.

The rafters 10 may be of any suitable cross section and are herein illustrated as comprising an angle bar having its top leg providing a plurality of apertures 13, there being one of such apertures for each spacer member 11. The spacer members 11 are shown as inverted channels extending transversely to the rafter 10 and of a length substantially equal to the width of the rafter. The apertures 13 are preferably square with dimensions equal to or slightly greater than the width of the channel members, the latter being provided with oppositely positioned integral clips 12, which extend through the aperture with their extremities oppositely turned away from the apertures into closely fitting contact with the lower face of the rafter.

Each channel member 11 has an aperture 23 concentric with the underlying aperture 13 in the rafter 10 and with the apertures 23 in the middle portion of a gutter member 14. The gutter member 14 extends longitudinally of the rafter 10 and rests upon the channel members 11 in spaced-apart relation to the rafter to permit the passage of air. The member 14 provides a support for the glazing construction and by reason of the relatively short spans between the channel members 11, is formed from relatively thin sheet metal which provides sufficient strength to carry the load without bending or distortion. The member 14 also provides troughs on each side of the rafter which are adapted to receive and carry away condensation moisture. A bolt 15, preferably formed from brass or other non-corrosive metal, extends through the registering apertures 23 and 24 and provides a shoulder 16 resting upon the member 14. The shoulder 16 cooperates with a nut 17 threaded on to the lower projecting end of the bolt to clamp the member 14 into close fitting contact with the channel member 11. The resulting close fit of the shoulder 15 with the top face of the member 14 seals the apertures 23 and 24 against entrance of moisture which might otherwise reach the rafter by flowing down around the bolt 15.

A cushion strip 18 of felt or similar material is positioned on top of and extends the full length of the supporting member 14 to provide a seat for glazing members 19. The strip 18 is pierced by the bolts 15, the bolts being convergent upwardly from the shoulder. Compression of the strip 18 in a manner hereafter described provides a cushion spacer for the glazing members 19 which also tends to prevent moisture from penetrating the strip 18 around the bolts 15. The tapered shank portions of the bolts 15 are adapted to be wedged through smaller diametered apertures in the cushion strip 18 and thereby form a ridge sloping away from the bolt. The taper also assists the workman in accurately positioning the glazing members 19 with their opposite ends in equally spaced relation to the shoulder portion of the bolts, the bolts and surrounding ridges tending to maintain the glazing members in proper position during contraction and expansion resulting from temperature changes.

The space between the glazing members 19 is covered by a cushioning strip 20 of felt or other material and upon this is positioned a cap plate 21. The plate 21 has its middle portion positioned above the strip 20 with its lateral edges inclined downwardly and outwardly and terminating in flanges resting upon the strip. The strip 20 is pierced to receive the bolts 15 and the plate 21 is provided with apertures 25 through which the bolts project upwardly. Nuts 22, threaded on the upper projecting ends of the bolts 15 press the plate 21 into contact with the strip 20 and the resulting pressure compresses the edges of the strips 18 and 20 against the opposite faces of the glazing members 19 to provide a weather-tight seal. The uncompressed middle portion of the strip 18 is pierced by the bolts 15 and thereby provides ridges or humps around the bolts. The ridges or humps form guides for properly positioning the glass members 19 and prevent the latter from contacting with the bolts when the glass members expand.

From the above description it will be seen that the member 14 forms both a glass support and a cover which prevents condensation or outside moisture from reaching the rafter 10 and provides gutters adapted to receive and convey moisture to the ends of the construction where it may be disposed of in any suitable manner, and that the spacing between the gutter and supporting member permit circulation of air, thereby minimizing corrosion or electrolysis of the members, which might otherwise occur when different metals are assembled in contact. The spaces between the various members comprising the construction, also provide pockets for dead air when the conditions within the structure are not conducive to circulation of air therethrough as is the case where there are no drafts or the drafts are of considerable intensity. In either case, the pockets of dead air act as insulators tending to prevent corrosion and minimizing or entirely prevent condensation.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A support for a glazing construction comprising a rafter bar providing a plurality of holes in its upper edge, a plurality of apertured spacer members respectively overlying said holes and each providing detent means extending through the adjacent holes in operative engagement with the bar, a longitudinally extending supporting member resting upon the spacer members and providing a plurality of apertures respectively in register with the apertures in the spacer members, a plurality of bolts having their lower ends respectively extending through said registering apertures and each providing a shoulder in engagement with the supporting member, and a nut threaded on the lower end of each bolt to clamp the shoulder into close fitting engagement with the supporting member.

2. A support for a glazing construction comprising a rafter bar providing a plurality of holes in its upper edge, a plurality of apertured spacer members respectively overlying said holes and each providing detent means extending through the adjacent holes in operative engagement with the bar, a longitudinally extending supporting member resting upon the spacer members and providing a plurality of apertures respectively in register with the apertures in the spacer members, a plurality of bolts having their lower ends respectively extending through said registering apertures and each providing a shoulder in engagement with the supporting member, and a nut threaded on the lower end of each bolt to clamp the shoulder into close fitting engagement with the supporting member, said bolts being convergent upwardly from the shoulder to form an intermediate frusto-conical portion.

3. A support for a glazing construction comprising a rafter bar providing a plurality of holes in its upper edge, a plurality of apertured spacer members respectively overlying said holes and each providing detent means extending through the adjacent holes in operative engagement with the bar, a longitudinally extendng supporting member resting upon the spacer members and providing a plurality of apertures respectively in register with the apertures in the spacer members, a plurality of bolts having their lower ends respectively extending through said registering apertures and each providing a shoulder in engagement with the supporting member, a nut threaded on the lower end of each bolt to clamp the shoulder into close fitting engagement with the supporting member, said bolts being convergent upwardly from the shoulder to form an intermediate tapering portion, and a cushion strip resting upon and extending longitudinally of the supporting member, said strip being pierced by said bolts and wedged over the tapering portions thereof to provide ridges.

4. A glazing construction comprising a rafter bar providing a plurality of holes in its upper edge, a plurality of apertured spacer members respectively overlying said holes and each providing detent means extending through the adjacent holes in operative engagement with the bar, a longitudinally extending supporting member resting upon the spacer members and providing a plurality of apertures respectively in register with the apertures in the spacer members, a plurality of bolts having their lower ends respectively extending through said registering apertures and each providing a shoulder in engagement with the supporting member, a nut threaded on the lower end of each bolt to clamp the shoulder into close fitting engagement with the supporting member, said bolts being convergent upwardly from the shoulder to form an intermediate frusto-conical portion, a cushion strip resting upon and extending longitudinally of the supporting member, said strip being pierced by said bolts and wedged over the frusto-conical portions thereof to provide ridges, a pair of glass members respectively resting upon the opposite edges of said strip with the edges stopping short of said ridges, and means mounted on the upper ends of said bolts adapted to compress said glass members on said cushion strip and to provide a weather tight cover for the space between the glass members.

5. A supporting member for glazing construction of the kind described, a plurality of longitudinally spaced-apart studs projecting in parallel relation from the outer face of the member, said member providing a plurality of apertures through which the studs respectively project, the intermediate portion of said studs being enlarged to provide circumambient shoulders bounded by end faces closely fitting the outer face of said member in the areas immediately surrounding the apertures, the side faces of the shoulders being convergent away from the member and the outer ends of the studs being threaded for the purpose described, and means on the inner projecting ends of the studs clamping said end faces of the shoulders against the outer face of the member to prevent moisture entering the apertures and to maintain the studs in exact parallel relation.

6. A supporting member for glazing construction of the kind described, a plurality of longitudinally spaced-apart studs projecting in parallel relation from the outer face of the member, said member providing a plurality of apertures through which the studs respectively project, the intermediate portion of said studs being enlarged to provide circumambient shoulders bounded by end faces closely fitting the outer face of said member in the areas immediately surrounding the apertures, the side faces of the shoulders being convergent away from the member and the outer ends of the studs being threaded for the purpose described, means on the inner projecting ends of the studs clamping said end faces of the shoulders against the outer face of the member to prevent moisture entering the apertures and to maintain the studs in exact parallel relation, and a cushion strip positioned on the outer face of said member and providing a plurality of apertures through which the shoulders respectively project.

7. The combination in glazing construction of a supporting member, a plurality of longitudinally spaced-apart studs projecting in parallel relation from the outer face of the member, said member providing a plurality of apertures through which the studs respectively project, the intermediate portion of said studs being enlarged to provide circumambient shoulders bounded by end faces closely fitting the outer face of said member in the areas immediately surrounding the apertures, the side faces of the shoulders being convergent away from the member, means on the inner projecting ends of the studs clamping said end faces of the shoulders against the outer face of the member to prevent moisture entering the apertures and to maintain the studs in exact parallel relation, a cushion strip positioned on the outer face of said member and providing a plurality of apertures through which the shoulders respective project, said strip apertures having transverse dimensions smaller than the maximum transverse dimensions of the shoulders whereby the shoulders are wedged in the strip apertures to form corresponding projections in limited areas of the strip surrounding the studs, glass members resting on the strip in spaced relation to the studs, a cover member overlapping the glass members, and means on the studs for pressing the cover member toward said glass members.

SANFORD K. HUSTON, JR.